United States Patent [19]

Austin et al.

[11] 4,006,825
[45] Feb. 8, 1977

[54] NOVEL FISHING ROD SUPPORT

[76] Inventors: Milton Austin, 3 Spielman Road, Fairfield, N.J. 07006; Arthur G. Kendall, 37 Passaic Ave., Livingston, N.J. 07039

[22] Filed: Mar. 17, 1975

[21] Appl. No.: 558,961

[52] U.S. Cl. .............................. 211/60 R; 211/64; 24/241 SP
[51] Int. Cl.² ......................................... A47F 7/00
[58] Field of Search ............. 211/60 R, 64, 62, 63, 211/57, 68; 248/201; 24/241 SP

[56] References Cited

UNITED STATES PATENTS

| | | | |
|---|---|---|---|
| 1,066,555 | 7/1913 | Treiber | 211/68 |
| 3,065,513 | 11/1962 | Warner et al. | 24/241 SP |
| 3,507,398 | 4/1970 | Schaefer | 211/64 X |
| 3,524,572 | 8/1970 | Hall | 211/60 R X |
| 3,643,811 | 2/1972 | Howerton | 211/64 |
| 3,792,775 | 2/1974 | Riddle | 211/60 R |
| 3,848,786 | 11/1974 | Baxter | 211/60 R X |

FOREIGN PATENTS OR APPLICATIONS 2,013,133   9/1971   Germany .............................. 211/57

*Primary Examiner*—Ramon S. Britts
*Assistant Examiner*—Peter A. Aschenbrenner
*Attorney, Agent, or Firm*—Silverman and Jackson

[57] ABSTRACT

A fishing rod support which may be mounted on either a wall or a ceiling surface which comprises a pair of cooperating bracket members comprising a proximal bracket adapted to receive the handle portion of said rod, and a distal bracket provided with a U-shaped channel for receiving the tip portion of said rod, said channel having its longitudinal dimension in parallel relation to the plane of said wall or ceiling surface, and means for retaining said tip within said channel comprising a lip extending perpendicular to said longitudinal dimension, and a pivotable gate attached at one end thereof to a peripheral edge of said channel. In an overhead installation of the bracket, the lip prevents the escape of the tip portion, should the boat be in motion with the gate in the unsecured position.

10 Claims, 6 Drawing Figures

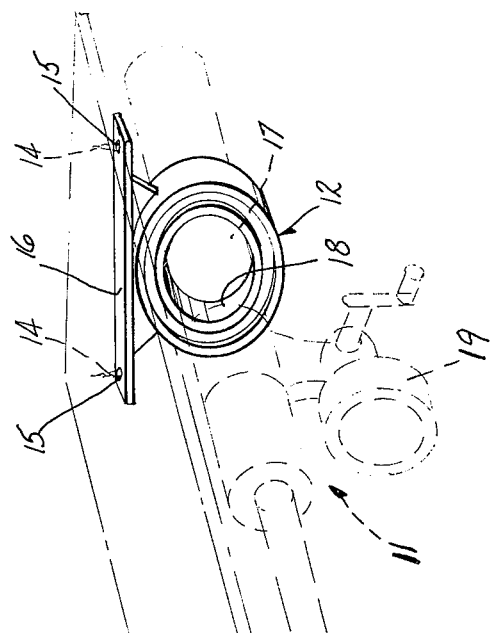
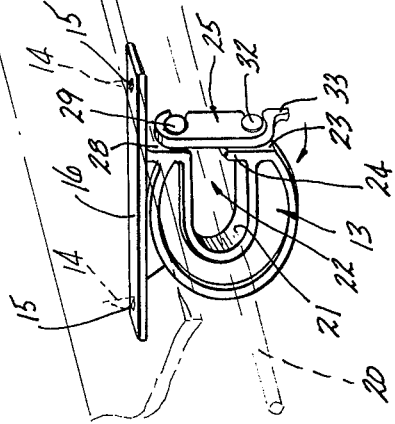
FIG-1
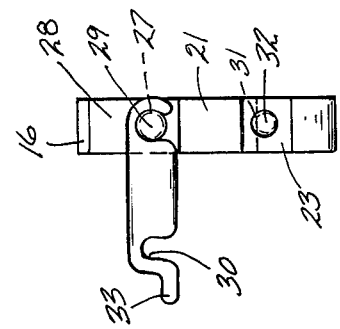
FIG-3A
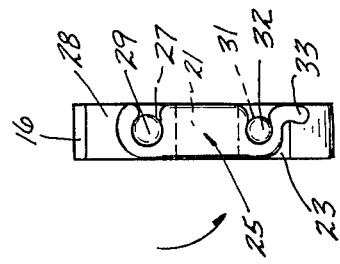
FIG-3B
FIG-2

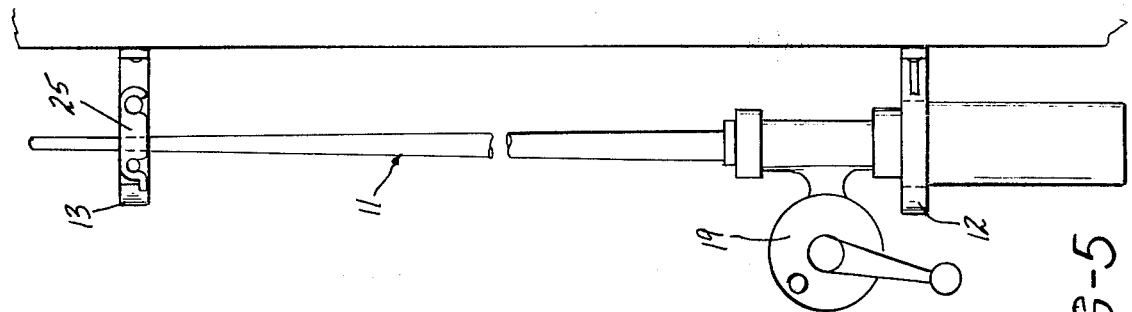
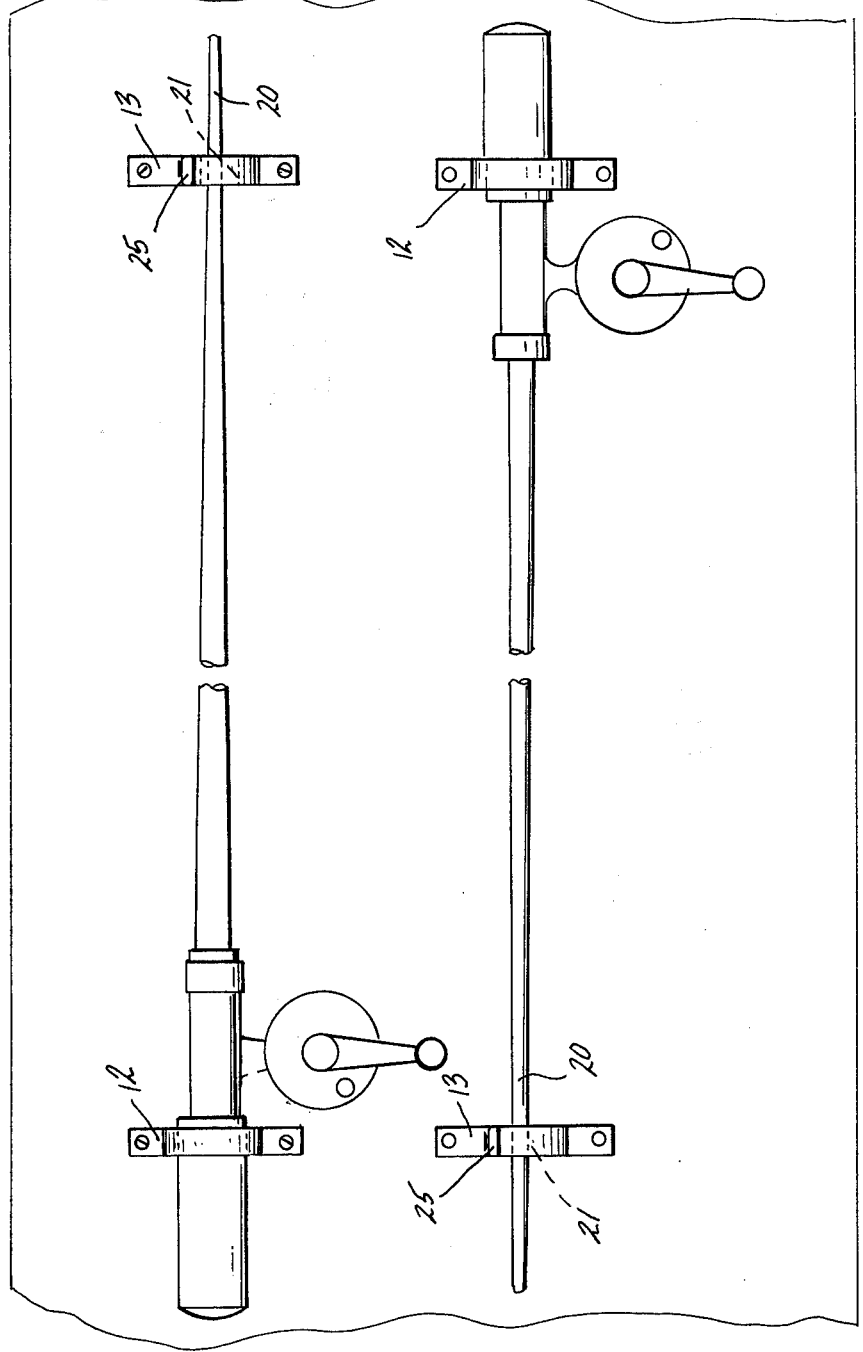

NOVEL FISHING ROD SUPPORT

BACKGROUND OF THE INVENTION

The invention generally relates to fishing rod support structures, and particularly to such structures as are useful to support the rod when not in use.

A wide variety of support structures are presently known which are useful for the support of fishing rods in storage on sea going vessels such as deep sea fishing boats and the like. Such structures may comprise elaborate racks employing locking mechanisms having a multitude of moving parts, and are often fabricated from materials such as metals and woods which are more complex to manufacture and which require extensive treatment with protective materials to withstand the prolonged exposure to a saline atmosphere. Also, many of the known support structures, particularly those designed to provide overhead support, are unreliable with the result that the rods or poles often dislodge and drop when the boat is in motion.

SUMMARY OF THE INVENTION

In accordance with the present invention, a fishing rod support structure is disclosed which comprises a pair of bracket members mountable in the overhead position or on a wall surface, said brackets comprising a proximal bracket adapted for receiving the handle portion of the rod, and a distal bracket adapted for receiving the tip portion thereof. The distal bracket is characterized by the provision therein of a U-shaped channel having a longitudinal dimension in parallel relation to the plane of the surface to which the bracket is attached. The tip portion is prevented from escaping said channel by a means comprising a lip located at the mouth of said channel which extends thereinto, and a gate pivotally attached at one end thereof to a peripheral edge of said channel and adapted to pivot into position to fully block said mouth and close off said channel.

The lip on the distal bracket retains the tip of the fishing rod within the channel in the instance where the boat is in motion and the gate is inadvertently left unlocked.

The fishing rod support of the present invention comprises only three separate parts and is easily and inexpensively fabricated from a wide variety of suitable materials, including many organic thermoplastic resin materials.

Accordingly, it is a principal object of the present invention to provide a fishing rod support which may be employed on either a ceiling or a wall surface.

It is a further object of the present invention to provide a fishing rod support as aforesaid which is simply and inexpensively manufactured and installed, and comprises a minimum number of parts.

It is a still further object of the present invention to provide a fishing rod support as aforesaid which provides a secondary retaining means for the tip of the fishing rod operable in an overhead installation of said support.

Further objects and advantages will become apparent to those skilled in the art from the ensuing description which proceeds with reference to the accompanying figures.

DESCRIPTION OF THE DRAWINGS

FIG. 1 is a perspective view, partly in phantom, of an overhead installation of the fishing rod support of the invention.

FIG. 2 is an exploded view of the distal bracket member of the fishing rod support of the invention.

FIG. 3A is a side view illustrating the distal bracket member with the gate open to receive the tip of a fishing rod.

FIG. 3B is a side view, partly in phantom, showing the distal bracket member with the gate in the closed position.

FIG. 4 is a fragmentary front view of the horizontal installation of the fishing rod support on a wall.

FIG. 5 is a fragmentary side view of the vertical installation of the fishing rod support on a wall.

DETAILED DESCRIPTION

Referring to the drawings in detail wherein like numerals indicate like parts and initially to FIG. 1, the fishing rod support in accordance with the invention is illustrated as installed in an overhead position on a roof or ceiling 10 which may be located in a boat such as a cabin cruiser, though limitation thereto is not intended. The fishing rod 11, shown in phantom, is suspended between bracket members 12 and 13. Bracket members 12 and 13 are adapted for securement to ceiling 10 with conventional fastening means, such as screws 14 or the like, by openings 15 provided in planar base members 16.

Bracket member 12 comprises a proximal bracket which receives the handle portion 17 of fishing rod 11 within circular opening 18 located therein. Rod 11 is prevented from sliding backwards through opening 18 by reel 19, generally located in the position illustrated in FIG. 1. Bracket member 12 is of one-piece construction and may be easily manufactured in a variety of ways discussed in greater detail hereinafter.

Bracket member 13 comprises a distal bracket similar in general configuration to bracket member 12, which is adapted to receive the tip portion 20 of rod 11 by the provision therein of a U-shaped channel 21. Channel 21 is situated within the body of bracket member 13 such that its longitudinal dimension is located in a plane containing base member 16. This configuration is particularly advantageous when the support is employed in the overhead position, as the tip 20 is permitted to rest therein unaided, while the user may fully secure the rod in the manner described later.

Channel 21 opens at mouth 22 to receive tip portion 20. Mouth 22 is defined by the outer peripheral surface of bracket 13 comprising a first peripheral edge 23 located at the lower end of the mouth opening. Peripheral edge 23 is extended upward and in a vertical direction as depicted in FIGS. 1–3B, in perpendicular relation to the longitudinal dimension of channel 21, to form lip 24, which partially obstructs the opening of mouth 22. Lip 24 comprises a further feature of the invention as it serves to restrain tip portion 20 from sliding out of channel 21 in the event that bracket 13 is unlocked and the surface and structure to which it is attached is in motion. Thus, in high seas or the like, lip 24 will effectively prevent escape of the fishing rod.

The means for retaining the tip portion 20 of fishing rod 11 securely within bracket 13 further comprises a gate 25 comprising a roughly rectangular planar structure adapted to pivot into a fixed position to fully obstruct mouth 22 and thereby prevent the escape of the tip. Thus, for example, in FIG. 1, gate 25 is shown in the closed position, and tip 20 is securely held within channel 21. The foregoing features and their method of operation will be described in greater detail with reference to FIGS. 2, 3A and 3B.

Referring now to FIG. 2, comprising an exploded view of bracket 13, gate 25 is seen to comprise a planar bar-shaped structure possessing two detents of generally circular configuration located respectively at opposite ends thereof. Major detent 26 is larger in size and, as illustrated in FIGS. 1, 3A and 3B, is adapted for engagement with cylindrical hinge 27 located on a second peripheral edge 28, appearing in the aforenoted figures to be vertically extended and above mouth 22. In particular, detent 26 is snapped into position on hinge 27 and gate 25 is permitted to pivot by the movement of detent 26 thereon. Detent 26 is prevented from lateral disengagement from hinge 27, by the radial expansion of hinge 27 at its free end to form head portion 29.

The opposite end of gate 25 houses a second minor detent 30, which, as illustrated, may be of lesser diameter than detent 26 though the invention should in no way be construed as limited thereto. Detent 30 is adapted for detachable engagement with corresponding cylindrical catch 31 in similar manner to detent 26 and hinge 27, with the exception, as noted, that detent 30 is designed to disengage to permit gate 25 to pivot into an open position. Catch 31 is located on peripheral edge 23 and possesses radially enlarged head portion 32 which retains detent 30 in a manner corresponding to head portion 29 on hinge 27.

The entire mechanism as above-described, constitutes the novel locking means of the invention. As can be seen, the locking means is elementary in design and manufacture and involves only one moving part, while providing a positive securement of the fishing rod tip portion 20 within distal bracket 13.

The operation of the above locking means is sequentially illustrated in FIGS. 3A and 3B, respectively. In FIG. 3A, gate 25 is in the open position and mouth 22 leading to channel 21 is free for the insertion of a fishing rod tip portion, not shown. Upon the insertion of a fishing rod into bracket 13, gate 25 may be pivoted into engagement with catch 31, such as by grasping handle 33, which comprises a projection which may be provided at the end of the gate 25 adjacent detent 30 for that purpose. Though handle 33 is illustrated herein, its presence is representative of an optional embodiment of the invention, as gate 25 could be readily manipulated in its absence. Gate 25 is firmly secured to catch 31 by the snapping into place there n of minor detent 30. Removal of a fishing rod is simply accomplished by the reversal of the above procedure.

As noted earlier, the fishing rod support of this invention is of simple design and may be manufactured in a wide variety of ways. Thus, conventional materials, such as, metals and woods may be employed and the individual brackets machined to final shape, by techniques such as turning on latches, and the like or rolling, casting and stamping operations. The support may also be prepared from a wide variety of organic polymeric materials including both thermoplastic and thermosetting resins. Representative of such materials are thermoplastic materials such as polyesters, including the acetates, acrylates and methacrylates, polyamides, polycarbonates and various suitable polyolefins, and thermosetting materials such as phenol-formaldehyde and urethane resins and the like. These materials may be molded by various suitable conventional techniques such as extrusion, casting, hot stamping of pre-formed stock and injection molding. In a preferred embodiment, the brackets are prepared from thermoplastic polymeric materials which are favorably processed by injection molding. The support is molded into three separate parts comprising brackets 12 and 13, and gate 25. Assembly is accomplished by snapping gate 25 into place on hinge 27 and catch 31 at detents 27 and 30 respectively.

As stated earlier, the support is capable of installation in a variety of positions on both ceiling and wall structures. Referring back to FIG. 1, an overhead installation is depicted, which is likely to be the most common manner employed in seagoing vessels and the like. FIGS. 4 and 5 schematically illustrate the installation of the support on a wall structure. In FIG. 4, two fishing rods are shown mounted in reversed end-for-end relationship in the horizontal position, by two sets of brackets 12 and 13. In both installations, bracket 13 is mounted so that channel 21 opens in the upward position, and can thereby cradle tip portion 20 without the engagement of gate 25.

FIG. 5 depicts a vertical wall installation of a fishing rod with the support of the invention. For this installation, the rod must be restrained from sliding vertically downward and out of the support. To this end, the installation should either be made in close proximity to the floor or deck, or the rod should be stored with the reel 19 mounted thereon.

The support may be prepared in a variety of aesthetically pleasing configurations, colors and textures within the scope of the invention and may, thus, be prepared in a multitude of fast colors and in textures such as wood grain, in the instance where organic polymeric resins are employed as starting stock.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. A fishing rod support comprising a pair of cooperating bracket members adapted for attachment to either a horizontal or a vertical surface to support said fishing rod, said bracket members comprising:
    a proximal bracket member adapted to receive the handle portion of said rod;
    a distal bracket member possessing a U-shaped channel adapted to receive the tip portion of said rod, the longitudinal dimension of said channel lying in a plane parallel to the plane of said surface, and said channel possessing a mouth defined by a first and a second peripheral edge of said distal bracket member; and
    means associated with said channel for retaining said tip portion securely therein comprising a lip extending into said mouth from said first peripheral edge in a plane perpendicular to said longitudinal dimension to partially obstruct said mouth, and a gate located in a plane parallel with the plane of said lip, said gate moveably anchored at one end thereof to said second peripheral edge, and adapted to pivot into position to fully obstruct said mouth and thereby prevent the escape of said tip.

2. The support of claim 1 wherein said gate is anchored to said second peripheral edge of the provision in said gate at one end thereof of a major detent which movably engages a cylindrical hinge located on said second peripheral edge.

3. The support of claim 2 wherein said distal bracket further includes means for locking said gate in position in obstruction of said mouth.

4. The support of claim 3 wherein said locking means comprises a minor detent located in said gate at the end opposing said major detent and adapted for engagement with a cylindrical catch located on said first peripheral edge.

5. The support of claim 4 wherein said hinge and said catch are provided with radially expanded head portions serving to hold said major detent and said minor detent, respectively, in position thereon.

6. The support of claim 1 further comprising a handle located on said gate adjacent said minor detent.

7. The support of claim 1 wherein said bracket members are prepared from metal.

8. The support of claim 1 wherein said bracket members are prepared from wood materials.

9. The support of claim 8 wherein said organic polymeric material comprises thermoplastic resins which are fabricated by injection molding.

10. The support of claim 1 wherein said bracket members are prepared from organic polymeric material.

* * * * *